United States Patent [19]
Atkins et al.

[11] 3,723,967
[45] Mar. 27, 1973

[54] INDUCTION-KEYED DOOR-LOCK AND POWER CONTROL CIRCUIT FOR AUTOMOTIVE VEHICLES AND THE LIKE

[75] Inventors: Carl E. Atkins, Montclair; Paul A. Carlson, New Providence, both of N.J.

[73] Assignee: Wagner Electric Corporation, Newark, N.J.

[22] Filed: Mar. 24, 1971

[21] Appl. No.: 127,463

[52] U.S. Cl. ............... 340/63, 180/114, 307/10 AT, 317/146, 331/65, 340/64
[51] Int. Cl. .......................... B60r 25/04, B60r 25/10
[58] Field of Search ........ 340/58, 64, 63; 307/10 AT, 307/10 R; 123/146.5 B, 179 BG, 198 B; 180/114, 112; 331/65; 317/134, 146

[56] References Cited

UNITED STATES PATENTS

| | | | |
|---|---|---|---|
| 3,092,806 | 6/1963 | Field | 340/58 |
| R25,977 | 3/1966 | Rosso | 317/146 |
| 3,344,629 | 10/1967 | Burney | 331/65 |
| 3,228,490 | 1/1966 | Ackman | 180/112 |
| 3,550,408 | 12/1970 | Archaux et al. | 307/10 AT |

*Primary Examiner*—John W. Caldwell
*Assistant Examiner*—Glen R. Swann, III
*Attorney*—Eyre, Mann & Lucas

[57] ABSTRACT

A control circuit actuable by an inductive keying circuit, the inductor of which must be placed in a predetermined spatial relationship with the inductor in a tank circuit in the control circuit to effect keying. The energization and de-energization of a relay is thus controlled, and this relay in turn controls at least one door-unlocking solenoid. Circuitry is provided for automatically energizing each door-locking solenoid when the associated vehicle door is sequentially open and closed, and for manually energizing each of the locking and unlocking solenoids. Power control circuitry is also provided to prevent engine start-up by an unauthorized person who has broken into the vehicle, to energize an alarm circuit in such event when the unauthorized person actuates the starting switch, and to enable engine start-up by actuation of the starting switch within a predetermined length of time after an authorized person has unlocked the vehicle.

24 Claims, 3 Drawing Figures

Patented March 27, 1973
3,723,967
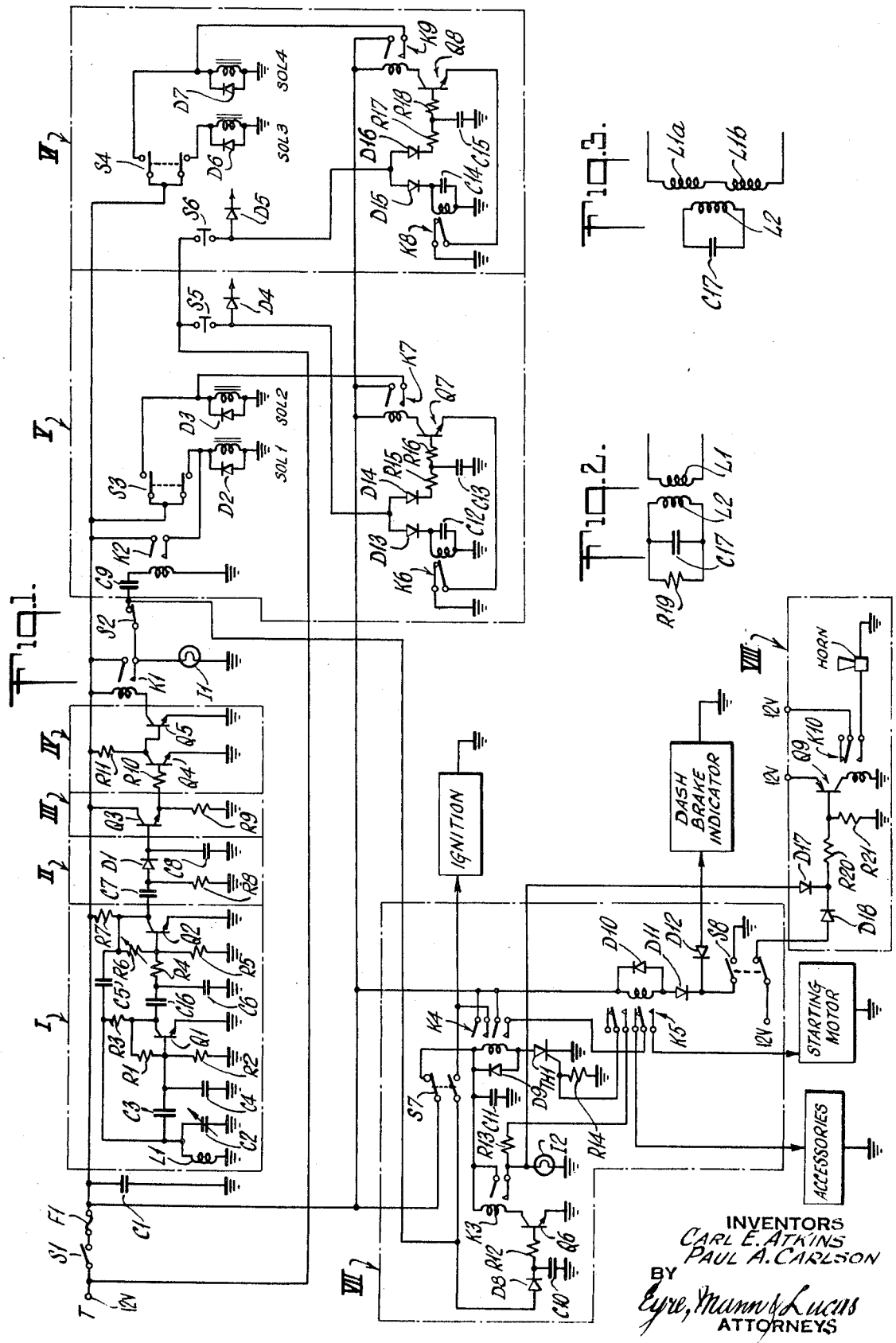
INVENTORS
CARL E. ATKINS
PAUL A. CARLSON
BY
Eyre, Mann & Lucas
ATTORNEYS

INDUCTION-KEYED DOOR-LOCK AND POWER CONTROL CIRCUIT FOR AUTOMOTIVE VEHICLES AND THE LIKE

BRIEF DESCRIPTION OF THE INVENTION

The present invention relates to a door-lock and power control circuit for automotive vehicles and the like. Entry to the vehicle is normally achieved by the placement of the inductor in an inductive keying circuit in a predetermined spatial relationship with an externally-mounted inductor which forms part of the tank circuit in an oscillator in the control circuit. This operation causes the energization of a relay which in turn causes application of an energizing pulse to the winding of at least the solenoid which unlocks the door on the driver's side of the vehicle, thereby enabling entry by the operator. When the operator has exited and closed the door by which he exited, switching and timing circuitry effects automatic locking of the doors of the vehicle. This circuitry includes a toggle switch associated with each door lock's solenoids. Each toggle switch may be manually actuated from within the vehicle to afford direct control of each of the locking and unlocking solenoids. The inductively-keyable portion of the control circuit also provides a signal via the aforementioned relay to a power control circuit to enable engine start-up by subsequently closing a starting switch within a predetermined period of time after termination of said signal. By normally holding the ignition circuit open, the power control circuit serves to prevent engine start-up by unauthorized persons who succeed in breaking into the vehicle. The aforementioned signal from the inductively-keyable portion of the control circuit also disables an alarm circuit which would energize the vehicle horn if an unauthorized person broke into the vehicle and closed the starting switch.

BRIEF DESCRIPTION OF THE DRAWINGS

A better understanding of the present invention may be had by reference to the accompanying drawings, of which:

FIG. 1 is a schematic wiring diagram of the entire control circuit, in which all the relays are shown in the de-energized state;

FIG. 2 is a schematic wiring diagram of a preferred embodiment of the keying circuit for use with the control circuit shown in FIG. 1; and FIG. 3 shows an alternate arrangement of the inductor in the tank circuit in FIG. 1 in relation to the inductor of the keying circuit shown in FIG. 2.

DETAILED DESCRIPTION OF THE INVENTION

Referring now specifically to FIG. 1, terminal T serves to connect the circuit to a source of power having a nominal output voltage of +12 volts DC. This power is applied to the circuit through a key-operated enabling/disabling switch S1, a fuse F1, and a filtering capacitor C1. Oscillator I is a normally oscillatory modified Hartley oscillator in which inductance L1 and variable capacitance C2 form the tank circuit. The high frequency output of the oscillator I is converted to direct current by detection circuit II, the output of which is fed to the input terminal of an emitter-follower DC amplifier III, which is maintained normally conductive. The normally high output of DC amplifier III is fed to the input circuit of a two-stage amplifier IV, in which transistor Q4 is maintained normally conductive, thereby placing the base of transistor Q5 at near-ground potential. Consequently, transistor Q5 remains normally non-conductive, and the relay K1 whose coil is connected in series between the source of DC power and the collector of transistor Q5 is normally de-energized.

Inductance L1 is positioned exterior to the vehicle so that the inductance L2 in the keying circuit shown in FIG. 2 may be placed in juxtaposition therewith to decrease the output of the oscillator I by inhibiting the oscillation in the tank circuit. Thus, the keying circuit is effective to drastically reduce or eliminate the high frequency output of oscillator I. As a consequence, the DC output of detection circuit II will fall below the level required to maintain DC amplifier III conductive. In the two-stage amplifier IV, the base of transistor Q4 will drop to near ground potential, thereby causing that transistor to become non-conductive. The base of transistor Q5 is thus placed at a high positive potential, causing it to become conductive and thereby enable the flow of energizing current through the coil of relay K1. Thus, the indicating lamp I1 is energized through the armature and contact of relay K1, and line voltage is applied through test switch S2 to the blocking capacitance C9 of door lock controlling circuit V. The function of test switch S2 is to enable selective disconnection of the relay K1 from the door lock controlling circuit V and from the power control circuitry VII so that testing and adjustment of the keyable circuit (I, II, III, IV) may be carried out without actuating any of said normally-connected circuitry. When testing and adjustment procedures are carried out, indicating lamp I1 furnishes a signal indicating energization or de-energization of relay K1. With test switch S2 normally closed and relay K1 energized, full line voltage is applied through switch S2 and capacitance C9 to cause the winding of relay K2 to be energized only momentarily regardless of the period of energization of relay K1, and the winding of unlocking solenoid SOL 1 is also energized only momentarily through the armature and contact of relay K2, thereby causing the door on the driver's side to unlock. It will be readily appreciated that the contact of relay K2 could be connected to the windings of all the unlocking solenoids to enable simultaneous unlocking of all of the vehicle doors.

In the door lock controlling circuit V, the manually operable toggle switch S3 is positioned within the vehicle to enable the operator to control the unlocking solenoid SOL 1 and the locking solenoid SOL 2. Door switch S5 is maintained normally open when the associated door (on the driver's side) is closed, and completes a connection between the source of DC power and a delayed-pulse generating circuit connected to locking solenoid SOL 2 when the associated door is opened. Optionally, an audible warning circuit (not shown) interconnected with lights, accessories, etc., may be energized through diode D4 if any of the lights, accessories, etc., have been left energized. When door switch S5 closes, current flows through diode D13 to charge capacitance C12 and energize relay K6, thereby disconnecting the emitter of transistor Q7 from ground. Simultaneously, current flows through diode D14 and resistor R15 to charge timing circuit capacitor C13. When door switch S5 is reopened by closing the door, the emitter of transistor Q7 is again connected to ground upon the de-energization of relay K6 after a short time delay occasioned by the discharge of capacitor C12 through the winding of relay K6. Capacitor C13 now discharges through resistor R16, the base-emitter junction of transistor Q7, and the armature and contact of relay K6, thereby rendering transistor Q7 momentarily conductive. Thus, energization current will momentarily flow through the winding of relay K7 to cause momentary energization of locking solenoid SOL 2 by the DC power source via the armature and contact of relay K7. The corresponding elements in door lock controlling circuit VI function in an identical manner.

The power control circuitry VII controls the vehicle ignition circuit, the engine starting circuit, the alarm circuit VIII and (during starting) the dash brake indicator and the vehicle accessories such as the radio, tape deck, etc., and effects unlocking of the door on the driver's side when the engine is turned off. This circuit also responds to the signal produced by the energization of relay K1 by causing the capacitor C10 to be charged rapidly through diode D8 during the period of energization of relay K1. Capacitance C10 is preferably of a large value, so that its discharge through the base-emitter junction of transistor Q6 will extend over a period of approximately 30 to 40 seconds, during which period transistor Q6 will be maintained conductive. Consequently, the relay K3 will be energized for a like period of time, thereby energizing indicator lamp I2 and disabling the alarm circuit VIII by applying a high positive voltage to the base of transistor Q9 through diode D17 and resistance R20. Consequently, energizing current for relay K10 cannot flow across the emitter-collector junction of transistor Q9 during the period of energization of relay K3, thereby maintaining the horn de-energized. If the operator actuates starting switch S8 during this period of time, thereby closing its normally open upper armature and contact while opening its ganged normally closed lower armature and contact, the opening of the circuit through the lower armature and contact, diode D18 and resistance R20 will not cause energization of the alarm circuit VIII because of the disabling voltage applied through diode D17 and resistance R20. The closing of the upper armature and contact of switch S8 causes energization of relay K5, and the thyristor TH1 will be rendered conductive by the voltage generated at the high side of resistance R14 by the current flowing through the armature and contact of relay K3, resistance R13, and the upper armature and its lower contact in relay K5. Once thyristor TH1 has thus been energized, current will flow continuously through the normally-closed upper armature and contact of switch S7, through the winding of relay K4, and through the anode and cathode of thyristor TH1. When relay K4 is thus energized, DC power is applied through this relay's upper armature and contact to the ignition circuit. Also, with starting switch S8 still closed, DC power is applied through the lower armature and contact of relay K4 and the lower armature and its lower contact of relay K5 to the starting motor. When the vehicle engine has been started and the starting switch S8 is again opened, the winding of relay K5 will be de-energized and the accessories, which were disconnected from the source of power during engine start-up (i.e., during the period of energization of relay K5) to prevent excessive current drain on the power source, will be energized through relay K4's lower armature and contact and through relay K5's lower armature and its upper contact. The gate electrode of thyristor TH1 will also be disconnected from the source of DC power when the upper armature of the now de-energized relay K5 breaks the connection with its lower contact. However, thyristor TH1 will remain conductive as a result of sustaining anode-to-cathode current flow from the power source through terminal T, switch S1, fuse F1, the upper armature and contact of switch S7, and the winding of relay K4.

When the operator turns off the engine by momentarily opening the upper armature and contact of switch S7, thyristor TH1 is rendered non-conductive by cessation of anode-to-cathode current flow, which is extended by the discharge of capacitor C11 through the winding of relay K4 and through thyristor TH1. Thus, the same actuation of switch S7 also unlocks the door on the driver's side by applying 12 volt DC power through the upper armature and contact of relay K4, through the lower contact and armature of switch S7 and through capacitor C9 to the winding of relay K2, which is momentarily energized to cause momentary energization of unlocking solenoid SOL 1. Also, the capacitance C10 is rapidly charged by current flowing through the upper armature and contact of relay K4, through the lower contact and armature of switch S7, and through diode D8. Thus, if the operator desires to start the engine during a predetermined period of time (30–40 seconds) after he has turned off the engine, he may do so by simply actuating the starting switch S8, which again causes the sequence of events described above. After that predetermined period of time, capacitance C10 will have almost completely discharged through R12 and the base-emitter junction of transistor Q6, and relay K3 will no longer be energized. Thus, in order to start the engine, the operator must utilize the keying circuit as described earlier to cause relay K3 to become energized. To facilitate this procedure for the operator, a second inductively keyable circuit operative to energize relay K1 may be placed in the interior of the vehicle, e.g., on the steering wheel hub. If starting switch S8 is activated at any time during which relay K3 is not energized, e.g., by an unauthorized person who has broken into the vehicle, no disabling voltage is applied to the base of transistor Q9 of alarm circuit VIII through either diode D17 or D18. Consequently, the emitter-collector junction of transistor Q9 becomes conductive, allowing energization current to pass through the winding of relay K10 to draw its armature against the lower contact and close the circuit through the vehicle horn. A latching circuit may be employed to maintain the horn energized after de-actuation of starting switch S8.

In the preferred embodiment of the present invention shown in FIGS. 1, 2 and 3, the values of the various circuit elements are as follows:

| Capacitances | | Resistances | |
|---|---|---|---|
| C1 | 0.33 microfarads | R1,12 | 6.8K ohms |
| C2 | 200 picofarads (max.) | R2,3,4,5, | 1.K ohms |
| C3,6 | 100 picofarads | 14,15,17 | |
| C4 | 0.003 microfarads | R6 | 10K ohms(maximum) |
| C5 | 5.0 picofarads | R7 | 1.8K ohms |

| | | | |
|---|---|---|---|
| C7,16,8 | 0.01 microfarads | R8,13,20,21 | 10K ohms |
| C17 | 200 picofarads | R9 | 330K ohms |
| C9,10 | 160 microfarads | R10 | 22K ohms |
| C11 | 1000 microfarads | R11 | 100K ohms |
| C12,14 | 320 microfarads | R16,18 | 2.2K ohms |
| C13,15 | 80 microfarads | R19 | 47K ohms |
| Inductances | | Diodes | |
| L1,2 | 33 microhenries | D1-18 | 1N5060 |
| Transistors | | Thyristor | |
| Q1-8 | 2N3567 | Th1 | GE C160 |
| Q9 | 2N5142 | | |
| Lamps | | Solenoids | |
| I1,2 | CM-344 | SOL 1-4 | Dormeyer SS3296 |

The keying circuit comprising resistance R19, capacitance C17 and inductance L2 shown in FIG. 2 is preferred because of the power-dissipating capability afforded by the use of resistance R19. However, as shown in FIG. 3, capacitance C17 and inductance L2 alone are operative to perform the keying function of altering the oscillatory condition of the tank circuit comprising inductance L1 and capacitance C2. As is further shown in FIG. 3, inductance L1 may be divided into first and second components L1a and L1b, with the keying function being effected by positioning the inductance L2 of the keying circuit in a predetermined position in proximity to the junction of inductance components L1a and L1b. It will be readily appreciated that the oscillatory condition of the tank circuit may also be altered by directly varying the values of either inductance L1 or capacitance C2.

It will be readily appreciated that several subcombinations of the circuit shown in FIG. 1 have utility either alone or in other combinations. For example, the portion of the circuit (I, II, III, IV) which responds to the inductive keying circuit to actuate the first relay K1 may find a wide range of applications, e.g., to actuate a latch to enable access to a house, a room within a house, or a garage. Also, this portion of the circuit of FIG. 1 may be readily replaced by a variety of keyable circuits operative to perform the same function. For example, the circuit disclosed in U.S. Pat. No. 3,628,099 issued on Dec. 14, 1971 upon copending application Ser. No. 46,984 filed on June 17, 1970 in the name of Carl E. Atkins and Arthur F. Cake could be substituted in lieu of the aforementioned subcombination. The circuit disclosed in U.S. Pat. No. 3,624,415 issued on Nov. 30, 1971 upon copending application Ser. No. 38,960 filed on May 20, 1970 in the names of Carl E. Atkins and Arthur F. Cake may be similarly substituted.

The combination shown in FIGS. 1 and 2 with the power control circuitry VII removed therefrom remains useful for the purpose of controlling door locking and unlocking. Once the operator has gained access to the vehicle by actuating this particular subcombination, the ignition circuit may be operated by conventional means unassociated with the control circuit, rather than by the novel power control circuit VII. On the other hand, the power control circuit VII has utility apart from the combination in which it is shown in FIGS. 1 and 2 in that it could be actuated by a switch connected to conventional door locking/unlocking apparatus. Thus, if a vehicle were forceably entered, the engine could not be started.

The door lock control circuitry V and VI also has utility apart form the combination in which it is disclosed herein. For example, instead of being actuated by a relay K1, this circuitry could be actuated by a hidden or disguised manually operable switch accessible from the exterior of the vehicle.

The advantages of the present invention, as well as certain changes and modifications of the disclosed embodiment thereof, will be readily apparent to those skilled in the art. It is the applicant's intention to cover all those changes and modifications which could be made to the embodiment of the invention herein chosen for the purposes of the disclosure without departing from the spirit and scope of the invention.

What is claimed is:

1. A door-lock and power control circuit for an automotive vehicle, said control circuit comprising:
    1. keyable circuit means normally operative to provide a first signal and operative in response to the coupling of a keying circuit thereto to provide a second signal;
    2. door-lock control means associated with each vehicle door lock and operative to close the associated lock after the door has been opened and closed, with at least the first door lock control means being further operative to open the associated lock in response to said second signal provided by said keyable circuit means; and
    3. power control circuit means operative in response to said second signal provided by said keyable circuit means to enable start-up of the vehicle engine upon the closing of a first switch within a predetermined period of time after termination of said second signal, and further operative to turn off the vehicle engine and actuate at least said first door lock control means to open the associated lock upon the closing of a second switch.

2. The control circuit according to claim 1 wherein said keyable circuit means comprises:
    1. oscillator circuit means including a tank circuit formed by a first inductance and a first capacitance connected in parallel, said oscillator circuit means being operative to generate a signal which is variable in response to the degree of oscillation in said tank circuit;
    2. detection circuit means operative to convert said signal to a direct current signal;
    3. amplifier circuit means operative to open or close a load current path in response to predetermined variations in said direct current signal; and
    4. a first relay comprising a winding, an armature, and a contact mounted in cooperative make-and-break relationship with said armature, said winding being connected in the load current path controlled by said amplifier circuit means.

3. The control circuit according to claim 2 wherein the degree of oscillation in said tank circuit is controlled by a keying circuit comprising a second inductor and a second capacitor connected in parallel, said second inductor being selectably positioned in or removed from a predetermined spatial relationship with respect to said first inductor in said tank circuit.

4. The control circuit according to claim 2 wherein said amplifier circuit means comprises:
    1. an emitter-follower amplifier; and 2. a two-stage amplifier controlled by the output of said emitterrfollower amplifier, said winding of said relay being connected in the final stage of said two-stage amplifier.

5. The control circuit according to claim 2 further including:
   1. a test switch operative to enable connection or disconnection of said contact of said first relay to at least said first door lock control means and to said power control circuit means; and
   2. an indicator circuit energizable by actuation of said first relay.

6. The control circuit according to claim 1 wherein each of said door lock control means comprises:
   1. first and second solenoids for unlocking and locking, respectively, the associated door lock;
   2. a manually operable switch operative to enable selective energization of either said first solenoid or said second solenoid; and
   3. circuit means including a normally open switch and operative, when said switch is sequentially closed and opened, momentarily to energize said second solenoid.

7. The control circuit according to claim 6 wherein said circuit means comprises:
   1. timing circuit means operative to be energized upon closing said normally open switch;
   2. switching means operative to close an energizing current path through said second solenoid in response to an output from said timing circuit means; and
   3. relay means operative to delay energization of said second solenoid by said switching means until after said closed normally open switch is reopened.

8. The control circuit according to claim 6 wherein at least said first door lock control means further includes a second relay operative to energize said first solenoid in response to said second signal provided by said keyable circuit means.

9. The control circuit according to claim 8 wherein said second relay includes a winding connected in series with a blocking capacitor to enable only momentary energization of said relay means and said first solenoid.

10. The control circuit according to claim 1 wherein said power control circuit means comprises:
    1. enabling circuit means operative in response to said second signal generated by said keyable circuit means to enable engine start-up by actuating said first switch within a predetermined period of time after termination of said second signal;
    2. latching circuit means operative to maintain the application of electrical power to the associated circuit after said first switch has been actuated during said predetermined period of time during which said enabling circuit means is actuated; and
    3. a second switch operative when actuated to unlatch said latching circuit means.

11. The control circuit according to claim 10 wherein said latching circuit means further comprises discharge circuit means operative to maintain said latching circuit in a latched condition for a predetermined period of time after said second switch has been actuated.

12. The control circuit according to claim 10 wherein said second switch is further operative when actuated to actuate at least said first door lock control means.

13. The control circuit according to claim 10 wherein said power control circuit means further comprises relay means actuated by said first switch and operative to disconnect accessory circuits from the power source during the period of actuation of said first switch.

14. An inductively keyable control circuit comprising:
    1. oscillator circuit means including a tank circuit formed by a first inductance and a first capacitance connected in parallel, said oscillator circuit means being normally operative to generate a first signal in response to unsuppressed oscillation in said tank circuit and operative in response to suppressed oscillation in said tank circuit due to coupling of a keying circuit to said tank circuit to provide a second signal;
    2. detection circuit means operative to convert said first and second signals to a direct current signal; and
    3. amplifier circuit means operative to open or close a load current path in response to predetermined variations in said direct current signal.

15. The keyable control circuit according to claim 14 further comprising a first relay connected to said load current path and energizable by the flow of a predetermined minimum current in said load current path.

16. The keyable control circuit according to claim 14 wherein the degree of oscillation in said tank circuit is variable by a keying circuit comprising a second inductance and a second capacitance connected in parallel when said second inductance is positioned in a predetermined spatial relationship with respect to said first inductance in said tank circuit.

17. A lock control circuit comprising:
    1. first and second solenoids for unlocking and locking, respectively, an associated lock;
    2. a manually operable switch operative to enable selective energization of either said first solenoid or said second solenoid; and
    3. circuit means including a normally open switch, and operative when said switch is sequentially closed and opened, to momentarily energize said second solenoid.

18. The lock control circuit according to claim 17 wherein said circuit means comprises:
    1. timing circuit means operative to be energized upon closing said normally open switch;
    2. switching means operative to close an energizing current path through said second solenoid in response to an output from said timing circuit means; and
    3. relay means operative to delay energization of said second solenoid by said switching means until after said closed normally open switch is reopened.

19. The lock control circuit according to claim 17 further including a switch operative to energize said first solenoid in response to a predetermined input signal.

20. A power control circuit comprising:
    1. a first switch;

2. enabling circuit means operative in response to a predetermined input signal to enable application of electrical power to an associated circuit by actuating said first switch within a predetermined period of time after termination of said predetermined input signal;
3. latching circuit means operative to maintain the application of electrical power to the associated circuit after said first switch has been actuated during said predetermined period of time during which said enabling circuit means is actuated; and
4. a second switch operative when actuated to unlatch said latching circuit means.

21. The power control circuit according to claim 20 wherein said latching circuit means further comprises discharge circuit means operative to maintain said latching circuit in a latched condition for a predetermined period of time after said second switch has been actuated.

22. The power control circuit according to claim 20 in combination with an alarm circuit comprising:
1. alarm means operative to generate a signal when energized;
2. control circuit means operative to cause energization of said alarm means in the absence of any disabling signal;
3. first disabling circuit means normally operative to apply a disabling signal to said control circuit means through said first switch of said power control circuit when said first switch is unactuated; and
4. second disabling circuit means normally operative to apply a disabling signal to said control circuit means from said enabling circuit means of said power control circuit in response to said predetermined input signal.

23. The combination of a power control circuit and an alarm circuit according to claim 22 wherein said normally disabled control circuit means comprises:
1. a normally non-conductive transistor; and
2. a normally de-energized relay comprising an armature, at least one contact, and a winding, said winding being connected in the controlled current path of said transistor, said alarm means being connectable across a source of electric power by energization of said relay.

24. The combination of a power control circuit and an alarm circuit according to claim 22 wherein said first and second disabling circuit means comprise first and second diodes, respectively.

* * * * *